(12) United States Patent
Miyata et al.

(10) Patent No.: US 7,478,627 B2
(45) Date of Patent: Jan. 20, 2009

(54) FUEL CONTROL APPARATUS FOR INTERNAL COMBUSTION ENGINE

(75) Inventors: Toshiyuki Miyata, Okazaki (JP); Shigetoshi Hirano, Toyoake (JP); Takahiro Izuchi, Nagoya (JP)

(73) Assignee: Mitsubishi Jidosha Kogyo K.K., Tokyo (JP)

( * ) Notice: Subject to any disclaimer, the term of this patent is extended or adjusted under 35 U.S.C. 154(b) by 317 days.

(21) Appl. No.: 11/389,143

(22) Filed: Mar. 27, 2006

(65) Prior Publication Data

US 2006/0219222 A1    Oct. 5, 2006

(30) Foreign Application Priority Data

Apr. 5, 2005    (JP)    ............... 2005-108735

(51) Int. Cl.
*F02M 51/00* (2006.01)
*G01N 33/22* (2006.01)

(52) U.S. Cl. ............. 123/491; 123/1 A; 123/406.3; 123/685; 73/35.02; 701/104

(58) Field of Classification Search ......... 123/491, 123/494, 1 A, 406.3, 685, 179.3; 73/35.02; 701/104
See application file for complete search history.

(56) References Cited

U.S. PATENT DOCUMENTS 4,942,848 A * 7/1990 Terasaka .............. 123/1 A
6,314,944 B1 * 11/2001 Majima .............. 123/491
6,321,721 B1 * 11/2001 Okumura et al. ........ 123/491
6,637,413 B2 * 10/2003 Maloney et al. ........ 123/491
6,655,358 B2 * 12/2003 Maloney et al. ........ 123/491

FOREIGN PATENT DOCUMENTS

JP    2002-70631 A    3/2002

* cited by examiner

*Primary Examiner*—Stephen K Cronin
*Assistant Examiner*—J. Page Hufty
(74) *Attorney, Agent, or Firm*—Birch, Stewart, Kolasch & Birch, LLP

(57) ABSTRACT

When a combustion feedback correction coefficient to which a predetermined value is added in correspondence to half miss firing judgment exceeds a heavy fuel judgment value ($K_0$), heavy fuel judgment is made, and heavy fuel corresponding control for increasing the fuel amount by a combustion feedback correction coefficient (Kfb) and by prolongation of increasing fuel amount ($\tau$) immediately after the startup is performed. When startup is consecutive startup, having a small drop width of a cooling water temperature (TH), from the last engine stop, and the number of times of ignition (Nig) accumulated during the last running is smaller than a warming judgment value (Nig0) at re-startup after running under the heavy fuel corresponding control, miss firing judgment is regarded as being impossible and alternative control for increasing the fuel amount is performed instead of the heavy fuel corresponding control.

10 Claims, 3 Drawing Sheets

FUEL CONTROL APPARATUS FOR INTERNAL COMBUSTION ENGINE

BACKGROUND OF THE INVENTION

1. Field of the Invention

The present invention relates to a fuel control apparatus for an internal combustion engine, and more particularly to a fuel control apparatus which is capable of performing fuel control, during a startup phase, corresponding to heavy fuel.

2. Description of the Related Art

When heavy fuel which is not excellent in volatility is used in an internal combustion engine, the internal combustion engine has such a tendency that an air-fuel ratio inclines to a lean side to make a combustion state become worse along with an increase in the fuel amount adhered to an inlet port. In particular, when catalyst warm-up control is carried out by retarding ignition timing and leaning the air-fuel ratio for the purpose of rapidly activating a catalyst during an engine cold state startup phase, and so forth, the leaning of the air-fuel ratio by the catalyst warm-up control and the leaning of the air-fuel ratio by use of the heavy fuel coincide with each other. As a result, there arises such a problem that the idling revolution becomes unstable as the combustion state deteriorates. In order to prevent such malfunction from being caused, the control corresponding to the heavy fuel is performed. In the heavy fuel corresponding control concerned, for example, the fuel amount is increased by setting an increased correction coefficient of the fuel injection amount whenever miss firing is judged based on a revolution situation of the internal combustion engine. As a result, the leaning due to the use of the heavy fuel is suppressed, thereby stabilizing the idling revolution.

However, when the cold state startup is continuously performed, from the second time startup, the fuel amount supplied to a cylinder is increased by evaporation of the adhered fuel along with abrupt temperature rise in the inlet port and the inlet valve immediately after the startup in addition to an increase in the fuel amount which is generally performed immediately after the startup. As a result, in spite of the use of the heavy fuel, no judgment for the miss firing is made, and no heavy fuel corresponding control is also performed. Though non-performing of the heavy fuel corresponding control results in that the leaning of the air-fuel ratio due to the use of the heavy fuel is caused, deterioration in the combustion state due to the leaning of the air-fuel ratio does not become apparent while an increase in the fuel amount immediately after startup is performed. Thereafter, when an increase in the fuel amount supplied immediately after startup is stopped, and the operation is completely shifted to the above-mentioned catalyst warm-up control, a combustion state deterioration resulting from the non-performing of the heavy fuel corresponding control appears to cause the unstable idling revolution.

As a measure for coping with such malfunction, it is expected, when consecutive re-startup as described above is judged, to perform an alternative control, for example, the control for performing increasing correction or the like in the fuel injection amount instead of the heavy fuel corresponding control. Various kinds of techniques for judging the re-startup of the internal combustion engine have been proposed by for instance Japanese Unexamined Patent No. 2002-70631 (hereinafter referred to as "Patent document 1"). Patent document 1 discloses a control apparatus for gradually changing fuel injection timing and for judging fuel properties based on the amount of change in fuel injection timing until the amount of change in engine speed reaches a predetermined value. In this control apparatus, when a temperature difference between a cooling water temperature and an intake air temperature at startup of the engine exceeds a re-startup judgment value, the re-startup (i.e., the above-mentioned consecutive re-startup) is judged, and the last judged value of fuel properties is applied, thereby omitting the processing for judging the present fuel properties.

Thus, it is thought that when the consecutive re-startup is judged based on the technique disclosed in Patent document 1, this case is regarded as a situation in which no heavy fuel corresponding control is performed due to impossibility of the miss firing judgment, and the fuel amount is increased by performing the above-mentioned alternative control instead of the heavy fuel corresponding control.

The technique for judging the consecutive re-startup disclosed in Patent document 1 takes notice of that the temperature difference between the cooling water temperature and the intake air temperature at the startup phase changes in correspondence to a time interval from the last engine stop to the present start-up. With this judging technique, however, the situation in which the miss firing judgment becomes impossible due to the supply of the evaporated fuel to the cylinder is merely indirectly guessed. It is impossible to make a precise judgment directly reflecting the rise of the temperature in the inlet port and the inlet valve, which was the original cause of the malfunction. Thus, no alternative control is performed in spite of the situation in which no heavy fuel corresponding control is performed due to the impossibility of the judgment for the miss firing. As a result, there is anxiety in which the instability of the idling revolution due to combustion state deterioration cannot be suppressed.

SUMMARY OF THE INVENTION

An aspect of the present invention is a fuel control apparatus for an internal combustion engine, comprising: miss firing judging means for judging a miss firing state of the internal combustion engine; fuel property judging means for judging properties of fuel used in the internal combustion engine based on an miss firing judgment made by the miss firing judging means; heavy fuel correspondence controlling means for, when the fuel property judging means judges that the used fuel is heavy fuel, performing heavy fuel corresponding control for increasing the fuel amount supplied to the internal combustion engine; running time period calculating means for calculating a running time period of the internal combustion engine during running of the internal combustion engine; and miss firing judgment impossibility phase fuel amount increasing means for, when the running time period calculated by the running time period calculating means is smaller than a first judgment value, performing alternative control for increasing the fuel amount instead of the heavy fuel corresponding control in a re-startup phase of the internal combustion engine after the fuel property judging means judges that the used fuel is the heavy fuel.

Another aspect of the present invention is a method of controlling fuel of an internal combustion engine, comprising: judging a miss firing state of the internal combustion engine; judging properties of fuel used in the internal combustion engine based on judgment results for the miss firing state; performing heavy fuel corresponding control for increasing the fuel amount supplied to the internal combustion engine when the used fuel is judged to be heavy fuel; calculating a running time period of the internal combustion engine during running of the internal combustion engine; and performing alternative control for increasing the fuel amount instead of the heavy fuel corresponding control when the calculated running lime period is smaller than a first judgment value in re-startup of the internal combustion engine after the used fuel is judged to be the heavy fuel.

BRIEF DESCRIPTION OF THE DRAWING

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of a fuel control apparatus for an internal combustion engine in the form of which the present invention is embodied will hereinafter be described with reference to the accompanying drawings.

Figure 1:
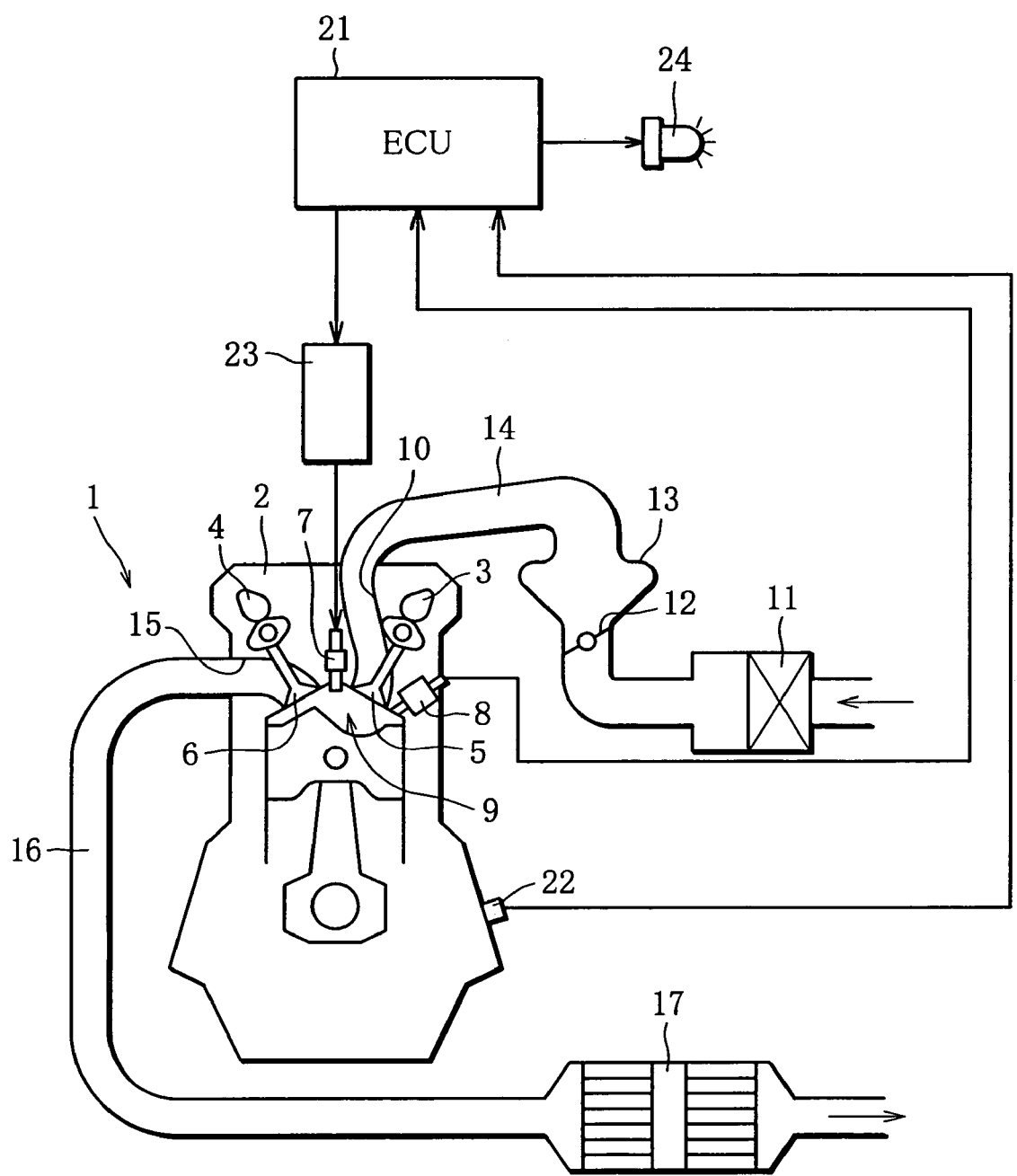
FIG. 1 is an overall constructional diagram showing a fuel control apparatus for an internal combustion engine according to an embodiment of the present invention.

FIG. 1 is an overall constructional diagram showing a fuel control apparatus for an internal combustion engine according to this embodiment of the present invention. The fuel control apparatus of this embodiment is constructed on an in-cylinder injection type series 4-cylinder gasoline internal combustion engine 1. A DOHC 4-valve type valve mechanism is adopted for the internal combustion engine 1. An inlet cam shaft 3 and an exhaust cam shaft 4 which are provided on a cylinder head 2 are driven for their running by a crank shaft (not shown). Thus, inlet valves 5 and exhaust valves 6 of each cylinder are opened and closed at predetermined timing by the inlet cam shaft 3 and the exhaust cam shaft 4.

An electromagnetic type fuel injector 8 is mounted together with an ignition plug 7 on the cylinder head 2 for every cylinder. High pressure fuel supplied from a fuel pump (not shown) is directly injected into a combustion chamber 9 in correspondence to opening/closing of the fuel injector 8. Inlet ports 10 of each cylinder are formed nearly in an upright direction in the cylinder head 2 so as to pass through a space between the inlet cam shaft 3 and the exhaust cam shaft 4. Intake air is introduced from an air cleaner 11 to the combustion chamber 9 through a throttle valve 12, a surge tank 13, an inlet manifold 14, and inlet ports 10 along with the opening of the inlet valves 5. Exhaust gas after combustion is exhausted from the combustion chamber 9 to exhaust ports 15 along with the opening of the exhaust valves 6, and then exhausted to the atmosphere through an exhaust passage 16 and a catalyst 17.

An engine control unit (ECU) 21 including an I/O unit (not shown), a memory device such as a ROM, a RAM or the like (not shown) for storing therein control programs, control maps and the like, a central processing unit (CPU) (not shown), timer counters (not shown) and the like is installed in a vehicle room. The ECU 21 performs the general control for the internal combustion engine 1. Various kinds of sensors such as a crank angle sensor 22 for outputting an SGT signal at intervals of a crank angle of 10° of the internal combustion engine 1 are connected to an input side of the ECU 21. Various kinds of devices such as igniters 23 for driving the ignition plugs 7, fuel injectors 8, and a warning lamp 24 provided in a driver's seat of a vehicle are connected to an output side of the ECU 21.

The ECU 21 determines the fuel amount to be injected, ignition timing and the like based on detected information from the respective sensors, and controls the driving of the fuel injectors 8 and the igniters 23 based on the control amount determined, thereby running the internal combustion engine 1.

In addition, the ECU 21 judges a combustion state of the internal combustion engine 1. When the miss firing occurs, the ECU 21 turns on the warning lamp 24 in accordance with the laws and regulations on an on board diagnosis (OBD) to inform a driver of this effect. On the other hand, at cold state startup of the internal combustion engine 1, the ECU 21 performs catalyst warm-up control for rapidly activating the catalyst 17 by retarding the ignition timing and leaning an air-fuel ratio. During the catalyst warm-up control, the ECU 21 increases the fuel amount based on the miss firing judgment in order to avoid combustion state deterioration. When judging that the extreme miss firing results from the use of the heavy fuel (when setting a heavy fuel judgment flag F1 based on a half miss firing judgment as will be described later), the ECU 21 performs the heavy fuel corresponding control, thereby improving the combustion state.

In addition, when the half miss firing cannot be judged due to a factor as will be described later in spite of the use of the heavy fuel, the ECU 21 increases the fuel amount of the internal combustion engine 1 by performing alternative control instead of the heavy fuel corresponding control to suppress combustion state deterioration. Hereinafter, the catalyst warm-up control, the heavy fuel corresponding control, and the alternative control will be described in detail.

Figure 2:
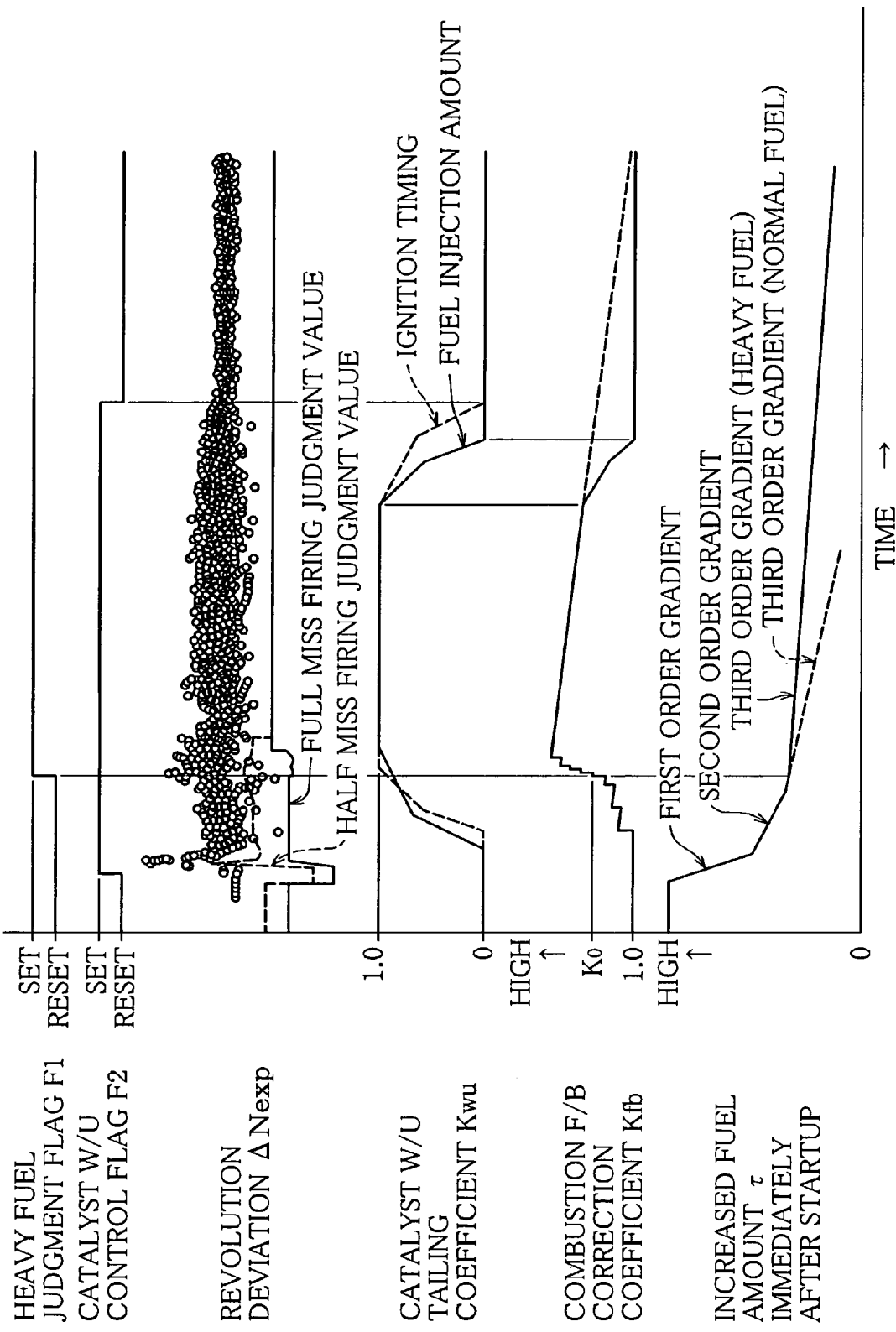
FIG. 2 is a time chart showing a fuel control situation when the internal combustion engine shown in FIG. 1 is cold-state-started by using heavy fuel.

A time chart of FIG. 2 shows a fuel control state when the internal combustion engine 1 is cold-state-started by using the heavy fuel. Hereinafter, processing executed by the ECU 21 will be described in accordance with this time chart shown in FIG. 2.

First, when the first time startup of the internal combustion engine 1 is carried out, the running of the internal combustion engine 1 is started with the fuel amount being increased based on setting of the increased fuel amount τ immediately after the startup. The increased fuel amount τ immediately after the startup is stopped (τ=0) after being gradually decreased from a maximum value so as to follow predetermined gradients (from a first order gradient to a third order gradient in FIG. 2) similarly to the normal fuel injection control. When the heavy fuel is used as will be described later, however, the gradient is corrected in a decrease direction as indicated from a broken line to a solid line based on the setting of the heavy fuel judgment flag F1.

On the other hand, a catalyst warm-up control flag F2 is set immediately after the startup of the internal combustion engine 1. While the catalyst warm-up control flag F2 is set, the retard of the ignition timing and the leaning of the air-fuel ratio are carried out as the catalyst warm-up control for rapidly raising the temperature of the catalyst 17. A setting time period of the catalyst warm-up control flag F2 is set in correspondence to a cooling water temperature TH of the internal combustion engine 1. The lower the cooling water temperature TH is and thus the longer time it takes to raise the temperature of the catalyst, the longer the setting time period is set and longer the catalyst warm-up control is continuously performed. On the other hand, when the cooling water temperature TH is equal to or higher than a predetermined value, and thus the warming of the internal combustion engine 1 has been completed, the catalyst warm-up control flag F2 is held in a reset state, and thus no catalyst warm-up control is performed.

In addition, catalyst warm-up tailing coefficients Kwu are applied to a correction coefficient for the ignition timing and a correction coefficient for the fuel injection amount in the catalyst warm-up control, respectively. These catalyst warm-up tailing coefficients Kwu are set from 0 to 1.0 in an increase direction so as to follow the predetermined gradient when the catalyst warm-up control flag F2 is set. On the other hand, these catalyst warm-up tailing coefficients Kwu are set from 1.0 to 0 in a decrease direction so as to follow the predetermined gradient when the catalyst warm-up control flag F2 is reset. In such a manner, a torque fluctuation due to a sudden change in ignition timing and fuel injection amount at the start and end of the catalyst warm-up control is suppressed.

In addition, the judgment processing for the full miss firing and the half miss firing is started to be executed at about the same time with the start of the catalyst warm-up control. Here, the full miss firing means relatively heavy miss firing which is obligated to inform a driver of the miss firing by using the warning lamp 24 or the like based on the OBD laws and regulations. On the other hand, the half miss firing means relatively light miss firing which is desirably suppressed though it fulfills the OBD regulation values.

The judgment processing for the full miss firing and the half miss firing is executed based on a fluctuation situation of an engine speed Ne corresponding to a combustion period of each cylinder. For example, in the series 4-cylinder engine 1, of this embodiment, in which the fuel is burned with a period of a 180° crank angle, a time period τL is calculated which is required for the engine 1 to revolve for a detection time period before combustion Tbefore set as a time period for a 30° crank angle containing a crank angle at which the engine speed Ne becomes near the minimum value for a 180° crank angle. Also, a time period τH is calculated which is required for the engine 1 to revolve for a detection time period after combustion Tafter set as a time period for a 30° crank angle containing a crank angle at which the engine speed Ne becomes near the maximum value. A revolution deviation ΔNexp (=NexpH−NexpL) is obtained from angular velocities NexpL and NexpH into which these time periods τL and τH are transformed, respectively.

The resulting revolution deviation ΔNexp is a fluctuation amount of revolution appearing between the detection time period before combustion Tbefore and the detection time period after combustion Tafter. Thus, the revolution deviation ΔNexp gradually decreases as the combustion becomes worse from the half miss firing to the full miss firing with respect to the running deviation ΔNexp when the combustion is normal. Therefore, the revolution deviation ΔNexp is regarded as an index representing the miss firing situation of the internal combustion engine 1. Thus, to which of the combustion states consisting of the normal combustion, the half engine miss firing, and the full engine miss firing the present combustion corresponds is judged based on predetermined judgment values (engine miss firing judging means).

As shown in FIG. 2, a half miss firing judgment value indicated by a broken line and a full miss firing judgment value indicated by a solid line are set as the judgment values. When the revolution deviation ΔNexp exceeds the half miss firing judgment value, the present combustion is judged to be normal combustion. When the revolution deviation ΔNexp exists between the half miss firing judgment value and the full miss firing judgment value, the present combustion is judged to be the half miss firing. Also, when the revolution deviation ΔNexp is smaller than the full miss firing judgment value, the present combustion is judged to be the full miss firing.

These judgment values are suitably changed depending on elapsed time from the startup of the engine. Thus, for a time period immediately after the startup (e.g., for 1 see) for which the remarkable revolution fluctuation originally appears in the internal combustion engine 1, both the judgment values are set so as to be largely decreased. Thus, the judgment for the half miss firing as well as the judgment for the frill miss firing is substantially stopped. After that, both the judgment values become the respective setting states for the judgment for the actual full miss firing and the actual half miss firing, and the miss firing judgment based on these judgment values is started. For example, when the present combustion is judged to be the full miss firing based on the revolution deviation ΔNexp, the warning lamp 24 is turned on to inform the driver of the full miss firing. In response thereto, the driver deals with it by performing repairs, etc.

It should be noted that the judging technique for the half miss firing and the full miss firing is not limited to the above-mentioned technique based on the revolution deviation ΔNexp, and may be changed to any other suitable well known technique.

In addition, the judgment for the half miss firing based on the revolution deviation ΔNexp is utilized for the improvements in the combustion states of the internal combustion engine 1. A numerical value is added to a combustion feedback correction coefficient Kfb with 1.0 as its initial value on a predetermined value by predetermined value-basis in correspondence to the half miss firing judgment. A fuel injection amount is corrected so as to be increased based on the combustion feedback correction coefficient Kfb after the addition of the numerical value. As a result, the combustion state deterioration caused by the leaning of the catalyst warm-up control is suppressed by an increase in the fuel amount based on the combustion feedback correction coefficient Kfb. Thus, the air-fuel ratio of the internal combustion engine 1 is held on the lean side to the neighborhood of the limit at which the half miss firing occurs. Here, not only the addition of the predetermined value corresponding to the half miss firing judgment is made for the combustion feedback correction coefficient Kfb, but also the combustion feedback correction coefficient Kfb is usually corrected in the direction of decrease so as to follow the predetermined small gradient.

When the combustion feedback correction coefficient Kfb gradually increases in accordance with the half miss firing judgment to exceed a heavy fuel judgment value Ko which is previously set, it is judged that the heavy fuel is being used, and the heavy fuel judgment flag F1 is set (fuel property judging means). The gradient applied to the increased fuel amount τ immediately after the startup is corrected in the direction of decrease based on the setting of the heavy fuel judgment flag F1. Hence, a decrease in the increased fuel amount τ immediately after the startup becomes gentle as indicated by the solid line as compared with the normal fuel use phase indicated by the broken line. Thus, stop timing for an increase in the fuel amount due to the increased fuel amount τ immediately after the startup is delayed. The correction for the gradient of the increased fuel amount τ immediately after the startup in the direction of decrease is a measure which is taken in consideration of that the combustion in the internal combustion engine 1 at this time is unstable due to the use of the heavy fuel, and that as will be described below, the half miss firing judgment is stopped immediately after the startup of the engine and thus the stabilization of the combustion by an increase in the fuel amount based on the combustion feedback correction coefficient Kfb cannot be desired. A shortage of the fuel is compensated for by the continuance of increasing the fuel amount based on the increased fuel amount τ immediately after the startup, thereby suppressing the combustion state deterioration.

The judgment for the half miss firing and the judgment for the full miss firing are carried out in the manner as described above. Also, an increase in the fuel amount based on the combustion feedback correction coefficient Kfb to which the predetermined value is successively added in accordance with the half miss firing judgment, and an increase in the fuel amount based on the increased fuel amount τ immediately after the startup for which the stop timing is corrected so as to be prolonged in accordance with the heavy fuel judgment flag F1 are carried out in the form of heavy fuel corresponding control (heavy fuel correspondence controlling means). Then, the half miss firing judgment is stopped at a time point after a lapse of predetermined time (e.g., 10 sec) from the engine startup, and only the full miss firing judgment is continuously carried out in accordance with a request from the ODB regulations. That is to say, the half miss firing judgment is stopped from a viewpoint of that since the combustion of the internal combustion engine 1 is stabilized to some degree at this time point, the half miss firing comes to hardly occur and the necessity for increasing the fuel amount based on the combustion feedback correction coefficient Kfb is reduced, and that since the judgment for the half miss firing becomes delicate along with the stabilization of the combustion, the reliability of an increase in the fuel amount based on the combustion feedback correction coefficient Kfb cannot be ensured.

The addition of the predetermined value corresponding to the half miss firing judgment is stopped and thus the subsequent combustion feedback correction coefficient Kfb continues to decrease so as to follow the predetermined gradient. At a time point when the above-mentioned catalyst warm-up control is stopped, the catalyst warm-up tailing coefficient Kwu is applied to the decreasing combustion feedback correction coefficient Kfb, and thus the combustion feedback correction coefficient Kfb, as indicated by the solid line, decreases to 1.0 so as to follow the gradient corresponding to the catalyst warm-up tailing coefficient Kwu. As a result, an increase in the fuel amount based on the combustion feedback correction coefficient Kfb is stopped. This processing is executed in response to that it becomes unnecessary to increase the fuel amount based on the combustion feedback correction coefficient Kfb along with the stop of the catalyst warm-up control.

During the running of the internal combustion engine 1, the ECU 21 successively accumulates the number of times of ignition Nig counted from the running time point. On the other hand, at the stop of the internal combustion engine 1, the ECU 21 stores the accumulated value of the number of times of ignition $N_{ig}$ at that time point (hereinafter simply referred to as "the number of times of ignition Nig"), data on the cooling water temperature TH (hereinafter referred to as "the stop phase cooling water temperature THstp"), and data on a setting state of the heavy fuel judgment flag F1 in the memory. These storage contents usually continue to be held during the engine stop resulting from the so-called engine stall (an ignition switch is in an ON state) as well as during the engine stop for parking (the ignition switch is in an OFF state) by the battery backup.

After that, when the internal combustion engine 1 is restarted, the ECU 21 judges the following three requirements.

1. The heavy fuel judgment flag F1 is set.

2. A difference between the stop phase cooling water temperature THstp and the cooling water temperature TH at startup (hereinafter referred to as "a startup phase cooling water temperature THstt") is smaller than a predetermined value a (second judgment value) (THstp−THstt<−α).

3. The number of times of ignition Nig counted from the startup time point is smaller than a warming judgment value Nig0 (first judgment value) (Nig<Nig0) (running time period calculating means).

The warming judgment value Nig0 is set in accordance with the startup phase cooling water temperature THstt based on the predetermined map. Thus, a smaller value is set as the warming judgment value Nig0 as the startup phase cooling water temperature THstt is higher. This results in that the requirement 3 is easily judged as being not established.

Here, in the following description, the case where the present startup is made following the first time startup will be described. In the case where the present startup is made after the startup is made plural times, however, values of the stop phase cooling water temperature THstp and the heavy fuel judgment flag F1 at the engine stop right before the present startup are applied as setting states of the stop phase cooling water temperature THstp and the heavy fuel judgment flag F1. Also, the accumulated value of the number of times of ignition Nig from the first time startup to the last engine stop is applied as the number of times of ignition Nig in this case.

When any one of the requirements 1 to 3 is not established, the ECU 21 performs the same normal fuel control as that described above. Thus, in the processing for setting the combustion feedback correction coefficient Kfb based on the half miss firing judgment, the ECU 21 successively adds the predetermined value to the combustion feedback correction coefficient Kfb from an initial value of 1.0 in accordance with the half miss firing judgment, and increases the fuel amount based on the combustion feedback correction coefficient Kfb after the addition of the predetermined value.

For example, when the requirement 1 is not established, it is possible to guess that the present running is made by using the normal fuel. The heavy fuel corresponding control for which the heavy fuel is supposed is essentially unnecessary, and the disadvantage resulting from that no heavy fuel corresponding control is performed based on the half miss firing judgment is not caused. Hence, the internal combustion engine 1 can be started in accordance with the normal fuel control without any problems.

When the requirement 2 is not established, it is possible to guess that since a drop width of the cooling water temperature TH is large, the restart is made after a lapse of some stop time (the consecutive re-startup is not made). Thus, it is regarded that the startup processing can be executed under nearly the same conditions as those in the first time startup phase. As a result, in this case, no phenomenon of supplying the evaporated fuel to the cylinder of the internal combustion engine 1 occurs. Thus, the heavy fuel corresponding control is normally performed based on the half miss firing judgment, and the internal combustion engine 1 can be started in accordance with the normal fuel control without any problems.

When the requirement 3 is not established, it is guessed that the first time running time period of the internal combustion engine 1 is long to some degree, the inlet ports 10 and the inlet valves 5 have previously been in the stable state after the temperature rise, and the evaporation of the adhered fuel is completed. As a result, similarly to the case of the requirement 2, no phenomenon of supplying the evaporated fuel to the cylinder occurs. Hence, the heavy fuel corresponding control is normally performed based on the half miss firing judgment. As a result, similarly, the internal combustion engine 1 can be started in accordance with the normal fuel control without any problems.

On the other hand, when all the requirements 1 to 3 are established, the ECU 21 sets 1.12 as the initial value of the combustion feedback correction coefficient Kfb in the processing for setting the combustion feedback correction coefficient Kfb, and increases the fuel amount by an increase in the initial value. As a result, the air-fuel ratio of the internal combustion engine 1 is corrected to the rich side. In this embodiment, the processing for setting and increasing the initial value of the combustion feedback correction coefficient Kfb functions as the alternative control made instead of the heavy fuel corresponding control (miss firing judgment impossibility phase fuel increasing means).

That is to say, in this case, the situation in which the heavy fuel is used in the present running as well and the combustion is easy to become worse is guessed based on the establishment of the requirement 1. It is guessed based on the establishment of the requirement 2 that the present startup is the consecutive re-startup in which the internal combustion engine 1 is restarted from the engine stop for a short time period. Also, it is guessed based on the establishment of the requirement 3 that the first time running time period of the internal combustion engine 1 is short (e.g., shorter than a time period of 20 to 30 sec), in other words, the inlet ports 10 and the inlet valves 5 are rising in their temperatures and thus do not yet reach the stable state, and the adhered fuel is being evaporated.

As a result, in spite of use of the heavy fuel, no half miss firing judgment is made resulting from the supply of the evaporated fuel to the cylinder. This results in that the prolongation correction for the stop timing of increasing the fuel amount cannot be performed by the heavy fuel corresponding control in accordance with the half miss firing judgment, i.e., the addition of the predetermined value to the combustion feedback correction coefficient Kfb and the increased fuel amount τ immediately after the startup. Therefore, in a stage of stopping an increase in the fuel amount based on the increased amount τ immediately after the startup, the situation is estimated in which the combustion state deterioration appears due to the leaning of the air-fuel ratio by the catalyst warm-up control. As described above, however, the initial value of the combustion feedback correction coefficient Kfb is set so as to be increased. As a result, the fuel amount is increased and thus the instability of the idle revolution due to a combustion state deterioration can be prevented from occurring.

Here, even when the half miss firing judgment is judged to be impossible based on the requirements 1 to 3, the half miss firing judgment is made depending on the running state of the internal combustion engine 1. In such a case, however, the predetermined value is successively added to the initial value, which is set so as to increase, of the combustion feedback correction coefficient Kfb, thereby increasing the fuel amount.

In the situation in which no heavy fuel corresponding control is made resulting from the impossibility of the miss firing judgment in such a manner, the initial value of the combustion feedback correction coefficient Kfb is increased as the alternative control to suppress a combustion state deterioration. In this embodiment, in order to judge the situation in which the half miss firing judgment becomes impossible, the requirement 3 relating to the number of times of ignition Nig is set in addition to the requirement 1 relating to the fuel properties and the requirement 2 relating to the consecutive re-startup. Thus, the number of times of ignition Nig is an index correlating with the warming situation of the internal combustion engine 1, in other words, the temperature rise in the inlet ports 10 and the inlet valve 5s. Hence, the judgment to which the temperature rise in the inlet ports 10 and the inlet valves 5 is directly reflected can be made based on the requirement 3. Thus, the addition of the requirement 3 to the requirements 1 and 2 makes it possible to more accurately judge the situation in which no heavy fuel corresponding control based on the half miss firing judgment is made. As a result, the processing for setting and increasing the initial value of the combustion feedback correction coefficient Ffb can be suitably executed as the alternative control. Thus, the instability of the idle revolution due to a combustion state deterioration can be reliably suppressed.

In addition, as apparent from the above description, during the use of the heavy fuel (the establishment of the requirement 1), the situation in which the half miss firing judgment is impossible can be judged even only based on the requirement 3 relating to the number of times of ignition Nig. In this embodiment, however, the further addition of the requirement 2 makes it possible to realize the more suitable judgment. For example, though when the first time running time period of the internal combustion engine 1 is short, the half miss firing judgment is judged to be impossible resulting from the establishment of the requirement 3, even in this case, when the stop time period from the first time engine stop to the present startup is long, the present startup processing is executed under nearly the same conditions as those in the first time startup. Hence, the alternative control becomes unnecessary since the normal half miss firing judgment can be actually made. At this time, in this embodiment, the requirement 2 is not established and the half miss firing judgment is regarded as being possible. Hence, a combination state deterioration can be more accurately suppressed by performing the heavy fuel corresponding control based on the more precise half miss firing judgment as compared with the alternative control.

On the other hand, the temperature rise in the inlet ports 10 and the inlet valves 5 depends not only on the running time period of the internal combustion engine 1, but also on the engine speed Ne. Even in the case of the same running time period, the temperature rise becomes more remarkable as the engine speed $N_e$ becomes higher. In the case of the above-mentioned requirement 3, however, the judgment is made based on the number of times of ignition Nig proportional to the engine speed Ne. As a result, the more precise judgment to which the temperature rise in the inlet ports 10 and the inlet valves 5 is reflected can be realized as compared with, for example, the judgment made based on the simple running time period.

Moreover, the alternative control is performed instead of the heavy fuel corresponding control by only correcting and increasing the initial value of the combustion feedback correction coefficient Kfb applied to the heavy fuel corresponding control. Hence, an effect is obtained in which the alternative control concerned can be performed without requiring a large change of the control program.

In addition, while the judgment is made based on the drop width of the cooling water temperature TH under the above-mentioned requirement 2, alternatively, the judgment can also be made based on the stop time period from the first time engine stop to the present startup. However, when the drop width of the cooling water temperature TH is applied as in this embodiment, the judgment results are obtained to which the temperature drop in the internal combustion engine 1 being stopped is reflected. As a result, the more precise judgment can be realized as compared with the case of the simple stop time period.

Figure 3:
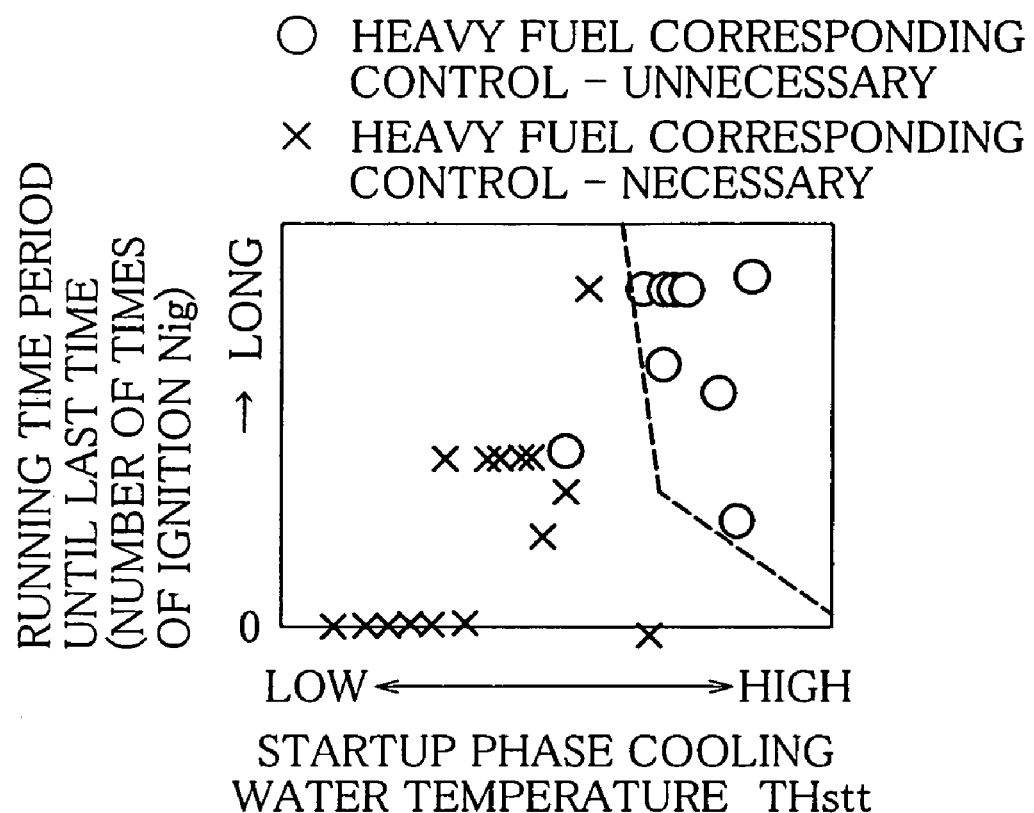
FIG. 3 is a diagram showing test results of judging whether or not heavy fuel corresponding control needs to be performed when a running time period until the last engine stop and a startup phase cooling water temperature are changed.

In addition, under the requirement 3, the warming judgment value Nig0 for judgment of the number of times of ignition Nig is set in accordance with the startup phase cooling water temperature THstt. The inventor of the present invention carried out tests about the influence of the startup phase cooling water temperature THstt exerted on the judgment relating to whether or not the heavy fuel control corresponding control must be performed by actually running the internal combustion engine 1. FIG. 3 is a graphical representation showing results of the tests in which the running time period (substantially correlating with the number of times of ignition Nig as described above) to the first time engine stop (the last engine stop when the internal combustion engine 1 is run plural times) and the startup phase cooling water temperature THstt were changed, and it was judged based on the revolution deviation ΔNexp whether or not the heavy fuel corresponding control must be performed. As can be seen from FIG. 3, there are, of course, obtained the test results supporting the above-mentioned requirement 3 under which the necessity for the heavy fuel corresponding control increases as the running time period decreases. Also, even in the case of the same running time period, the necessity for the heavy fuel corresponding control increases as the startup phase cooling water temperature THstt further drops. Consequently, reflection of the startup phase cooling water temperature THstt to the warming judgment value Nig0 used in the judgment for the number of times of injection Nig makes it possible to realize the more precise judgment.

While this embodiment has been completed in its description so far, it should be noted that the aspects of the present invention are not intended to be limited to this embodiment. That is to say, for example, while the above-mentioned embodiment has been described on the in-cylinder injection type series 4-cylindered gasoline internal combustion engine 1, the type of internal combustion engine 1 is not limited thereto. That is to say, for example, the present invention may also be applied to an inlet pipe injection type internal combustion engine, and cylinder arrangement of the internal combustion engine 1 may also be changed.

In addition, in the above-mentioned embodiment, the heavy fuel corresponding control is performed in order to prevent the malfunction from being caused due to the leaning of the air-fuel ratio when the catalyst warm-up control is performed during use of the heavy fuel. However, the present invention is not necessarily limited to the case where the catalyst warm-up control is performed. That is to say, the present invention may also be applied to the case where the heavy fuel corresponding control is performed without carrying out the catalyst warm-up control during the cold state startup phase.

Moreover, in the above-mentioned embodiment, whether or not the present fuel is the heavy fuel is judged by utilizing the combustion feedback correction coefficient Kfb which is set so as to increase in correspondence to the half miss firing judgment. However, the properties of the used fuel may also be judged by utilizing an independent technique irrespective of the combustion feedback correction coefficient Kfb.

On the other hand, in the above-mentioned embodiment, the number of times of ignition Nig used in the requirement 3 is successively accumulated from the time point when the internal combustion engine 1 is started. However, the number of times of ignition Nig does not need to be necessarily accumulated from the time point when the internal combustion engine 1 is started as long as it can be used as an index correlating with the temperature rise in the inlet ports 10 and the inlet valves 5. That is to say, for example, the number of times of ignition Nig may also be started to be accumulated from a time point when the heavy fuel judgment flag F1 is set based on the heavy fuel judgment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel control apparatus for an internal combustion engine, comprising:
    miss firing judging means for judging a miss firing state of said internal combustion engine;
    fuel property judging means for judging properties of fuel used in said internal combustion engine based on a miss firing judgment made by said miss firing judging means;
    heavy fuel correspondence controlling means for, when said fuel property judging means judges that the used fuel is heavy fuel, performing heavy fuel corresponding control for increasing the fuel amount supplied to said internal combustion engine;
    running time period calculating means for calculating a running time period of said internal combustion engine during running of said internal combustion engine; and
    miss firing judgment impossibility phase fuel amount increasing means for, when the running time period, at a time when said internal combustion engine is stopped, calculated by said running time period calculating means is smaller than a first judgment value, performing alternative control for increasing the fuel amount instead of the heavy fuel corresponding control in a re-startup of said internal combustion engine after said fuel property judging means judges that the used fuel is the heavy fuel.

2. A fuel control apparatus for an internal combustion engine according to claim 1, wherein:
    the first judgment value is set in correspondence to an engine temperature at the re-startup of the engine.

3. A fuel control apparatus for an internal combustion engine according to claim 1, wherein:
    said running time period calculating means accumulates the number of times of ignition, during the running of said internal combustion engine, as the running time period of said internal combustion engine; and
    said miss firing judgment impossibility phase fuel amount increasing means compares the number of times of ignition accumulated by said running time period calculating means with the first judgment value.

4. A fuel control apparatus for an internal combustion engine according to claim 1, wherein:
    when the running time period of said internal combustion engine is smaller than the first judgment value, and a difference between an engine temperature at a stop of running of the engine and an engine temperature at the re-startup of the engine is smaller than a second judgment value, said miss firing judgment impossibility phase fuel amount increasing means performs the alternative control instead of the heavy fuel corresponding control.

5. A fuel control apparatus for an internal combustion engine according to claim 1, wherein:
    said heavy fuel correspondence controlling means performs control for correcting and increasing a correction coefficient for a fuel amount injected in said internal combustion engine in correspondence to the miss firing judgment as the heavy fuel corresponding control; and said miss firing judgment impossibility phase fuel amount increasing means increases the fuel amount by correcting and increasing an initial value of the correction coefficient.

6. A method of controlling fuel of an internal combustion engine, comprising:
   judging a miss firing state of the internal combustion engine;
   judging properties of fuel used in said internal combustion engine based on judgment results for the miss firing state;
   performing heavy fuel corresponding control for increasing the fuel amount supplied to said internal combustion engine when the used fuel is judged to be heavy fuel;
   calculating a running time period of said internal combustion engine during running of said internal combustion engine; and
   performing alternative control for increasing the fuel amount instead of the heavy fuel corresponding control when the calculated running time period, at a time when said internal combustion engine is stopped, is smaller than a first judgment value in re-startup of said internal combustion engine after the used fuel is judged to be the heavy fuel.

7. A method of controlling fuel of an internal combustion engine according to claim 6, wherein:
   the first judgment value is set in correspondence to an engine temperature at the re-startup of the engine.

8. A method of controlling fuel of an internal combustion engine according to claim 6, wherein:
   the running time period of said internal combustion engine is calculated by accumulating the number of times of ignition during the running of said internal combustion engine.

9. A method of controlling fuel of an internal combustion engine according to claim 6, wherein:
   when the running time period of said internal combustion engine is smaller than the first judgment value, and a difference between an engine temperature at a stop of running of the engine and an engine temperature at the re-startup of the engine is smaller than a second judgment value, the alternative control is performed instead of the heavy fuel corresponding fuel.

10. A method of controlling fuel of an internal combustion engine according to claim 6, wherein:
   control for correcting and increasing a correction coefficient for the fuel amount injected in said internal combustion engine in correspondence to the miss firing judgment is performed in the heavy fuel corresponding control; and
   the fuel amount is increased in the alternative control by correcting and increasing an initial value of the correction coefficient.

* * * * *